(12) United States Patent
Crassin et al.

(10) Patent No.: US 9,547,931 B2
(45) Date of Patent: Jan. 17, 2017

(54) SYSTEM, METHOD, AND COMPUTER PROGRAM PRODUCT FOR PRE-FILTERED ANTI-ALIASING WITH DEFERRED SHADING

(71) Applicant: NVIDIA Corporation, Santa Clara, CA (US)

(72) Inventors: Cyril Jean-Francois Crassin, Paris (FR); Morgan McGuire, Williamstown, MA (US); Aaron Eliot Lefohn, Kirkland, WA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 59 days.

(21) Appl. No.: 14/704,875

(22) Filed: May 5, 2015

(65) Prior Publication Data

US 2015/0317827 A1 Nov. 5, 2015

Related U.S. Application Data

(60) Provisional application No. 61/988,836, filed on May 5, 2014.

(51) Int. Cl.
| | |
|---|---|
| G06T 15/80 | (2011.01) |
| G06T 1/60 | (2006.01) |
| G06K 9/52 | (2006.01) |
| G06K 9/62 | (2006.01) |
| G06T 15/00 | (2011.01) |

(52) U.S. Cl.
CPC .............. *G06T 15/005* (2013.01); *G06K 9/622* (2013.01); *G06K 9/6218* (2013.01); *G06K 9/6272* (2013.01); *G06T 1/60* (2013.01); *G06T 15/80* (2013.01)

(58) Field of Classification Search
CPC ........ G06T 15/506; G06T 15/50; G06T 15/60; G06T 15/80; G06T 15/06
See application file for complete search history.

(56) References Cited

U.S. PATENT DOCUMENTS

| | | | |
|---|---|---|---|
| 2010/0002000 A1* | 1/2010 | Everitt | G06T 15/503 345/426 |
| 2011/0090251 A1* | 4/2011 | Donovan | G06T 15/005 345/632 |

OTHER PUBLICATIONS

Crassin, C. et al., "Aggregate G-Buffer Anti-Aliasing," Proceedings of the ACM Symposium on Interactive 3D Graphics and Games 2015 (I3D'15), Feb. 2015, pp. 1-11.

(Continued)

*Primary Examiner* — Todd Buttram
(74) *Attorney, Agent, or Firm* — Zilka-Kotab, PC

(57) ABSTRACT

A system, method, and computer program product are provided for generating anti-aliased images. The method includes the steps of assigning one or more samples to a plurality of clusters, each cluster in the plurality of clusters corresponding to an aggregate stored in an aggregate geometry buffer, where each of the one or more samples is covered by a visible fragment and rasterizing three-dimensional geometry to generate material parameters for each sample of the one or more samples. For each cluster in the plurality of clusters, the material parameters for each sample assigned to the cluster are combined to produce the aggregate. The combined material parameters for each cluster are stored in an aggregate geometry buffer. An anti-aliased image may then be generated by shading the combined material parameters.

20 Claims, 9 Drawing Sheets

(56) References Cited

OTHER PUBLICATIONS

Salvi, "Surface Based Anti-Aliasing," Mar. 2012, retrieved from http://vidimce.org/publications/sbaa/sbaa_i3d2012.pdf.
Kerzner, "Streaming G-Buffer Compression for Multi-Sample Anti-Aliasing," Jun. 2014, retrieved from https://software.intel.com/sites/default/files/managed/50/32/gbufcomp.pdf.
Jouppi, "Z3: An Economical Hardware Technique for High-Quality Antialiasing and Transparency," 1999, retrieved from http://citeseerx.ist.psu.edu/viewdoc/download?doi=10.1.1.29.4990&rep=rep1&type=pdf.
Heitz, "Representing Appearance and Pre-filtering Subpixel Data in Sparse Voxel Octrees," EGGH-HPG'12, Eurographics conference on High Performance Graphics, Jun. 5, 2012, retrieved from https://hal.inria.fr/hal-00704461/file/HN12.pdf.
Bruneton, "A Survey of Non-linear Pre-filtering Methods for Efficient and Accurate Surface Shading," IEEE Transactions on Visualization and Computer Graphics, 2011, retrieved from http://maverick.inria.fr/Publications/2011/BN11/surveyTVCG.pdf.
Fournier, "Normal Distribution Functions and Multiple Surfaces," GI '92 Workshop on Local Illumination, 1992, pp. 45-50, retrieved from http://www.iro.umontreal.ca/~poulin/fournier/papers/Fournier-1992-NDF/Fournier-1992-NDFMS.pdf.
Olano, "Normal Distribution Mapping," UNC Chapel Hill Computer Science Technical Report 97-041, 1997, retrieved from http://www.cs.unc.edu/~olano/papers/ndm/ndm.pdf.
Toksvig, "Midmapping Normal Maps," NVIDIA Technical Brief, TB-01256-001, vol. 01, Apr. 2004, retrieved from http://developer.download.nvidia.com/whitepapers/2006/Mipmapping_Normal_Maps.pdf.
Han, "Frequency Domain Normal Map Filtering," 2007, retrieved from http://www.cs.columbia.edu/cg/normalmap/normalmap.pdf.
Olano, "LEAN Mapping," I3D 2010: Proceedings of the ACM SIGGRAPH Symposium on Interactive 3D Graphics and Games, Feb. 2010, retrieved from http://www.csee.umbc.edu/~olano/papers/lean/lean.pdf.
Lacewell, "Stochastic Billboard Clouds for Interactive Foliage Rendering," Journal of Graphics Tools, 2006, retrieved from http://www.cs.utah.edu/~lacewell/billboardclouds/billboardclouds.pdf.

\* cited by examiner

SYSTEM, METHOD, AND COMPUTER PROGRAM PRODUCT FOR PRE-FILTERED ANTI-ALIASING WITH DEFERRED SHADING

CLAIM OF PRIORITY

This application claims the benefit of U.S. Provisional Application No. 61/988,836, titled "Deferred Shading at Very High Multisample Rates," and filed May 5, 2014, the entire contents of which is incorporated herein by reference.

FIELD OF THE INVENTION

The present invention relates to anti-aliasing, and more particularly to anti-aliased deferred shading of graphics geometry.

BACKGROUND

Conventional high-quality renderers sample geometrically complex environments, such as those containing foliage, fur, or intricate geometry at high rates to capture sub-pixel detail. These environments are challenging for any rendering system, but are particularly difficult for real-time systems, especially those based on deferred shading, a technique frequently employed by games.

First, despite the high performance of modern graphics processing units (GPUs), evaluating a shading function at high sampling rates remains too costly, in terms of processing, for real-time applications. Second, because a deferred shading system delays all shading computations until after geometric occlusions have been resolved, the shading inputs are buffered for all samples. At high sampling rates, the storage and memory bandwidth costs of generating and accessing the buffered shading inputs become prohibitive. For example, a 1920×1080 geometry buffer (G-buffer) holding 16 samples per pixel encoded using a typical 20-bytes-per-sample layout requires over 600 MB of storage.

To reduce the processing and storage costs, game engines typically provision storage for, and limit shader evaluation to, only a few samples per pixel (e.g. four). Post-process anti-aliasing techniques may be used to increase image quality using neighboring pixels or temporally re-projected sample information from previous frames. However, the post-process anti-aliasing techniques generally introduce blur and fail to capture the appearance of sub-pixel details. Thus, there is a need for addressing these issues and/or other issues associated with the prior art.

SUMMARY

A system, method, and computer program product are provided for generating anti-aliased images. The method includes the steps of assigning one or more samples to a plurality of clusters, each cluster in the plurality of clusters corresponding to an aggregate stored in an aggregate geometry buffer, where each of the one or more samples is covered by a visible fragment and rasterizing three-dimensional geometry to generate material parameters for each sample of the one or more samples. For each cluster in the plurality of clusters, the material parameters for each sample assigned to the cluster are combined to produce the aggregate. The combined material parameters for each cluster are stored in an aggregate geometry buffer. An anti-aliased image may then be generated by shading the combined material parameters.

DETAILED DESCRIPTION

Aggregate G-buffer anti-aliasing (AGAA), is a technique to improve anti-aliasing of fine geometric details when deferred shading is used. A key feature is that the light shading rate may be decoupled from the geometric sampling rate. The geometric sampling rate is used during visibility testing, and therefore corresponds to the number of visible samples per pixel. When decoupled, the geometry sampling rate may be higher than the light shading rate in terms of the number of samples that are processed to produce each shaded pixel or fragment.

The following standard terms are used: A primitive is a planar polygon input to rasterization that is typically a triangle but may be a line, quad, or point sprite. A fragment is the portion of a primitive that lies within a pixel. A sample is a location (or the values stored at the location) within a pixel, which may be covered by a fragment. A geometry buffer (G-buffer) is a memory resource configured to store a multi-sampled texture map into which individual geometry samples representing the shading inputs (e.g., shading normal, BSDF coefficients) are written during a G-buffer generation pass. Subsequent deferred shading passes combine lighting with the G-buffer to produce a color image; alternately, semi-deferred passes instead re-rasterize the original geometry and combine the rasterized properties with those in the G-buffer and lighting.

Deferred and semi-deferred (sometimes referred to as forward+) shading techniques both separate rendering into two steps. The first pass, over geometry (i.e., geometric primitives are the input), stores the inputs to the shading computation at each sample in the geometry buffer (G-buffer) that is large compared with the final color buffer. The second pass, over the screen (i.e., pixel and/or sample coordinates are the input), reads the stored inputs to the shading computation from the G-buffer and computes the color of each pixel. The second step quickly becomes limited by computation, bandwidth, and peak memory usage for the G-buffer when there are many samples per pixel.

Figure 1:
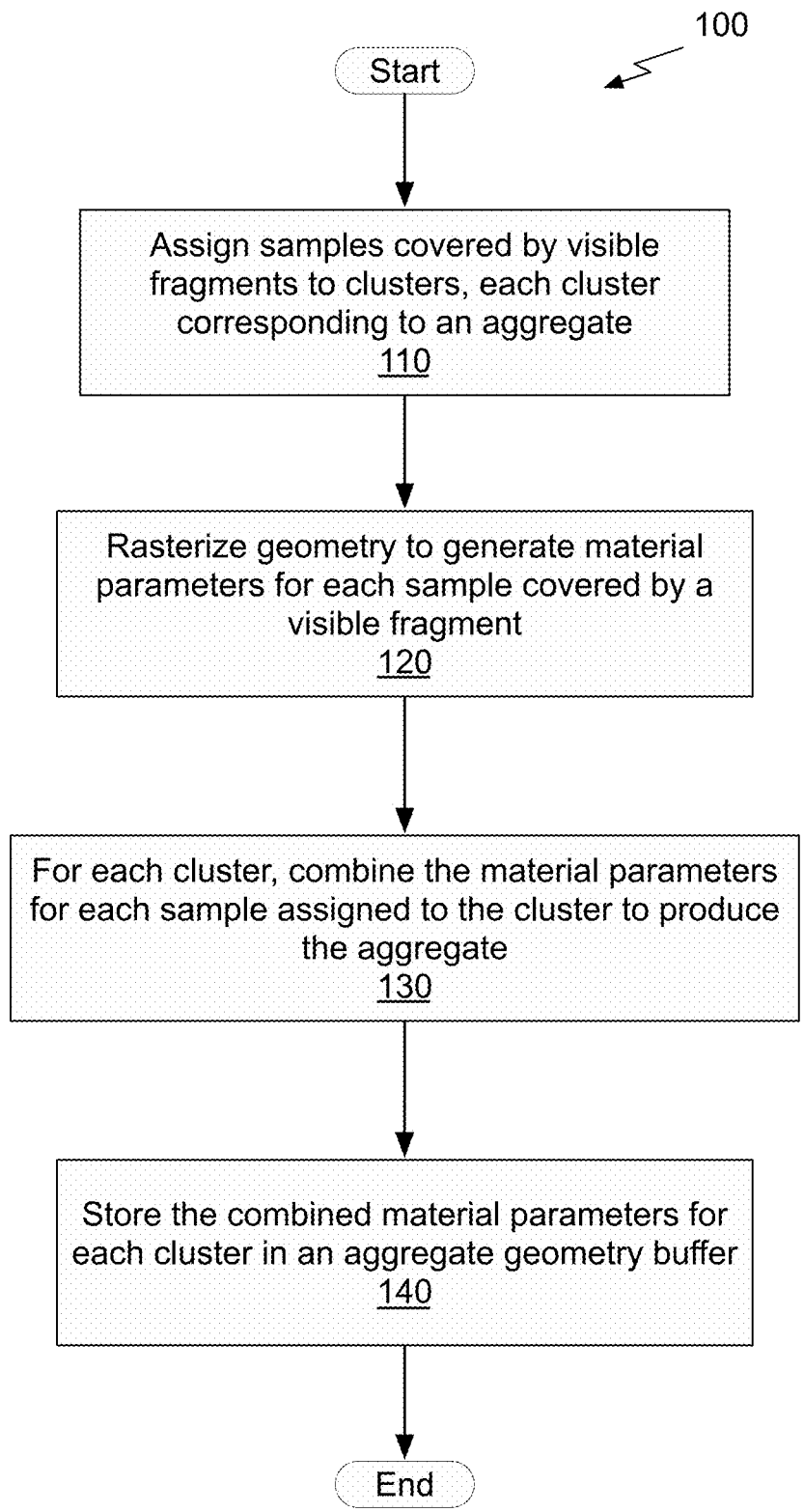
FIG. 1 illustrates a flowchart of a method for aggregate G-buffer anti-aliasing, in accordance with one embodiment.

FIG. 1 illustrates a flowchart of a method 100 for performing aggregate G-buffer anti-aliasing, in accordance with one embodiment. In the context of the present description, a buffer is a portion of memory allocated to store graphics data. In the context of the present description, pixels each include at least one sample position and a "sample" may refer to the position and/or graphics data (e.g., an attribute, parameter, material value) that is specific to the position.

At step 110, one or more samples covered by visible fragments are assigned to a plurality of clusters, where each cluster in the plurality of clusters corresponds to an aggregate. Prior to step 110, the geometry may be rasterized to produce a depth buffer containing one or more of per-sample depth values, per-sample screen coordinates, and per-sample normal vector values. The depth buffer may be used to identify the samples that are covered by the visible fragments.

The aggregate may be considered to be a "geometry" aggregate representing a statistical distribution of sub-pixel geometry. For example, the 32 sub-pixel samples used for each pixel when conventional anti-aliasing is performed may be reduced to only two aggregates for each pixel. A cluster may be defined to include samples from one or more primitives, even when the primitives have different orientations and/or disjoint surfaces (i.e., do not necessarily belong to the same object). Samples may be grouped based on distance and/or orientation to define the clusters. Details of step 110 are described in conjunction with FIG. 5C. In one scenario, all 32 samples within a region or pixel are covered by visible fragments and are assigned to one cluster. In another scenario, a portion of the visible samples within a region or pixel are assigned to a first cluster and the remaining visible samples within the region or pixel are assigned to a second cluster.

In one embodiment, the samples assigned to a cluster all reside within the same pixel. In another embodiment, the samples assigned to a cluster may reside within different pixels. The clusters may be formed based on one or more of per-sample depth values, per-sample screen coordinates, and per-sample normal vector values. In one embodiment, the per-sample normal vector values are low-precision normal data. In the context of the present description, a cluster includes one or more samples. In one embodiment, the maximum number of clusters for each pixel or screen-space region is fixed.

In one embodiment, a full-screen analysis is performed on a depth buffer to define the clusters and assign visible samples to the clusters. In one embodiment, the per-sample depth values, per-sample screen coordinates, and/or per-sample normal vector values are computed by rasterizing three-dimensional geometry at a geometric sampling rate that includes more than one sample per pixel. In one embodiment, the geometric sampling rate is at least eight samples per pixel. A depth buffer is produced without computing color or material values for the visible samples. In one embodiment, the depth buffer stores depth and normal vector values for each visible sample. In another embodiment, the depth buffer also stores stencil values.

At step 120, geometry is rasterized to generate material parameters (e.g., shading properties) for each sample of the one or more samples covered by visible fragments. A sample that is covered by a visible fragment is a visible sample. In one embodiment, the geometry is rasterized in a separate processing pass from the pass during which a depth buffer is generated. The depth buffer may be used to rasterize only the visible fragments to generate material parameters for each visible sample during step 120. In the context of the present description, the material parameters may include one or more of a material albedo, specular coefficient, emissive coefficient, coverage (or sample count), and roughness. In one embodiment, the material parameters are stored in a G-buffer.

At step 130, for each cluster in the plurality of clusters, the material parameters for each sample assigned to the cluster are combined to produce the aggregate. Importantly, the rasterized material parameters are combined as they are generated, so that it is not necessary to store the per-sample rasterized material parameters in a buffer. In one embodiment, additive blending is used to combine each material parameter of the samples assigned to a cluster to generate the aggregate. The cluster definitions constructed at step 110 provide a sample-to-aggregate mapping that is used to identify the samples corresponding to each aggregate. In one embodiment, the number of clusters is less than the number of samples per region or pixel.

In one embodiment, the material parameters are filtered to combine the material parameters for the aggregate. The normal vectors for an aggregate may be combined to generate a normal vector distribution function that models the orientations of the primitives corresponding to the aggregate, as well as the micro-facet distribution of the material corresponding to the aggregate. The normal vector distribution for an aggregate indicates the curvature of the aggregate. Specular lighting components may be combined to produce a combined specular component and diffuse lighting components may be separately combined to produce a combined diffuse component.

At step 140, store the combined material parameters for each cluster in an aggregate buffer (e.g., aggregate G-buffer). Instead of storing data for individual geometry samples, as is done in a conventional G-buffer, each aggregate stored in the aggregate G-buffer contains an aggregate entry representing a cluster of geometry samples. In one embodiment, two aggregate entries are stored for each pixel or region. In one embodiment, each aggregate entry includes a statistical description of a surface and filtered shading attributes (i.e., combined material parameters). In one embodiment, per sample attributes (e.g., texture coordinates, colors, and the like) are also stored in the aggregate G-buffer and deferred shading (e.g., lighting) operations are performed on the per-aggregate combined material parameters and the per sample attributes. The aggregate values stored in the aggregate G-buffer are the inputs to the deferred shading process that produces the final image. One or more of the method steps shown in FIG. 1 may be performed by shading program executed on a processor. In one embodiment, the processor is a parallel processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
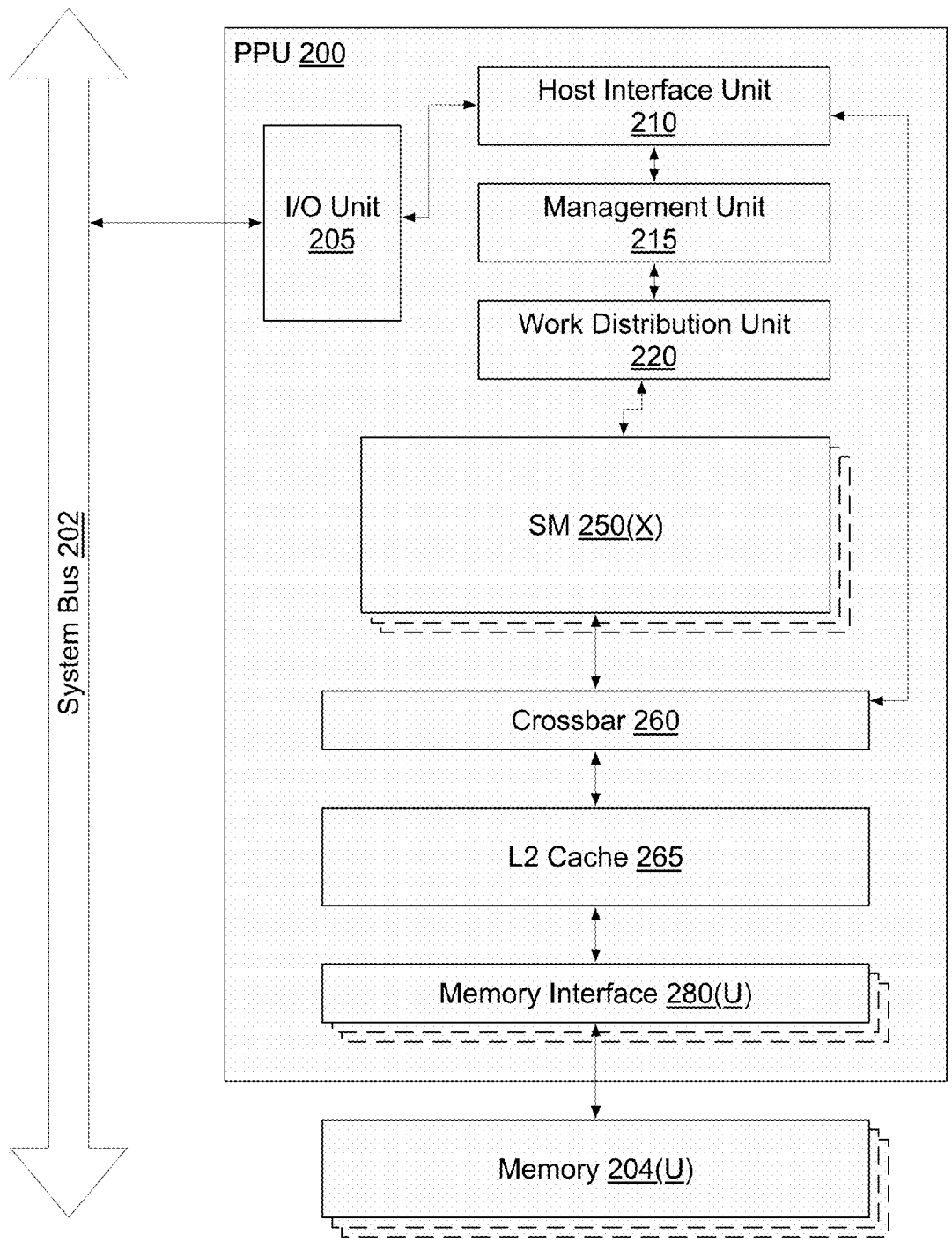
FIG. 2 illustrates a parallel processing unit (PPU), according to one embodiment.

FIG. 2 illustrates a parallel processing unit (PPU) 200, according to one embodiment. The various architecture and/or functionality of the various previous embodiments may be implemented within the PPU 200. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the grid management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the thread block array management unit (MU) 215 with pointers to one or more streams. The MU 215 selects one or more streams and is configured to organize the selected streams as a pool of pending thread block arrays. The pool of pending thread block arrays may include new thread block arrays that have not yet been selected for execution and thread block arrays that have been partially executed and have been suspended.

A work distribution unit 220 that is coupled between the MU 215 and the SMs 250 manages a pool of active thread block arrays, selecting and dispatching active thread block arrays for execution by the SMs 250. Pending thread block arrays are transferred to the active thread block array pool by the MU 215 when a pending thread block array is eligible to execute, i.e., has no unresolved data dependencies. An active thread block array is transferred to the pending pool when execution of the active thread block array is blocked by a dependency. When execution of a thread block array is completed, the thread block array is removed from the active thread block array pool by the work distribution unit 220. In addition to receiving thread block arrays from the host interface unit 210 and the work distribution unit 220, the MU 215 also receives thread block arrays that are dynamically generated by the SMs 250 during execution of a thread block array. These dynamically generated thread block arrays join the other pending thread block arrays in the pending thread block array pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more thread block arrays for execution. In one embodiment, the PPU 200 implements a SIMD (Single-Instruction, Multiple-Data) architecture where each thread block (i.e., warp) in a thread block array is concurrently executed on a different data set by different threads in the thread block. The driver kernel defines thread blocks that are comprised of k related threads, such that threads in the same thread block may exchange data through shared memory. In one embodiment, a thread block comprises 32 related threads and a thread block array is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the MU 215 may configure one or more SMs 250 to execute a vertex shader program that processes a number of vertices defined by the model data. In one embodiment, the MU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
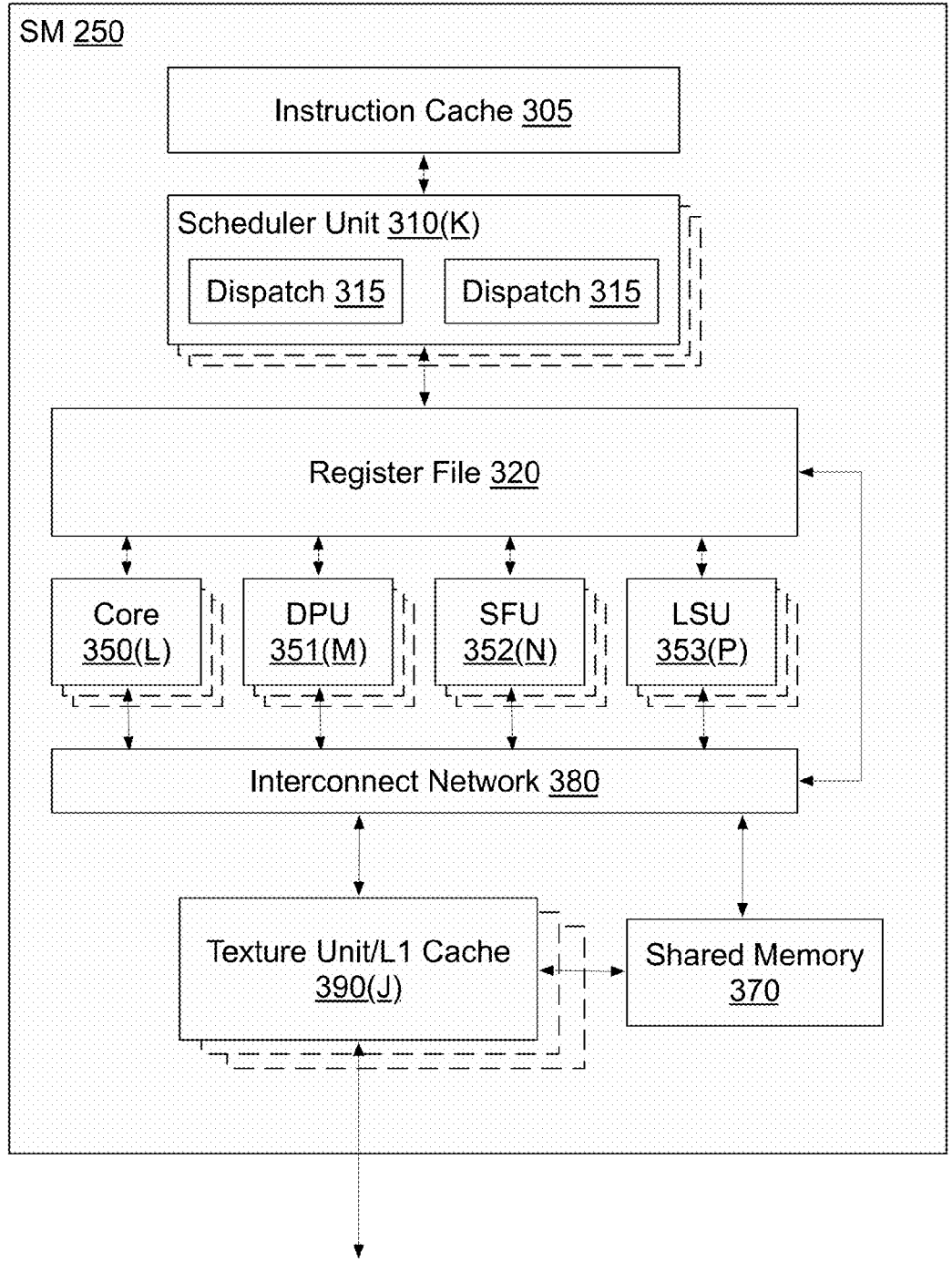
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active thread block arrays for execution on one or more SMs 250 of the PPU 200. The scheduler unit 310 receives the thread block arrays from the work distribution unit 220 and manages instruction scheduling for one or more thread blocks of each active thread block array. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mipmaps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Deferred Shading Using an Aggregate G-Buffer

A fully dynamic screen-space algorithm efficiently aggregates material parameters across disjoint surfaces for deferred shading to produce anti-aliased images. In one embodiment, as few as two to three aggregates are stored and shaded for each pixel. Each aggregate is a combination of material parameters for the samples assigned to a cluster. The geometric sampling rate used to determine visibility and define the clusters may be much higher than two or three samples per pixel to produce high quality anti-aliased images, even when complex geometry is rendered. The storage requirements and memory bandwidth are reduced compared with conventional deferred shading techniques because the number of aggregates per pixel may be lower than the geometric sample rate. A shader program may be configured to implement deferred shading using an aggregate G-buffer. After the aggregates are computed, light shading is performed on the aggregates to generate the anti-aliased image.

Figure 4:
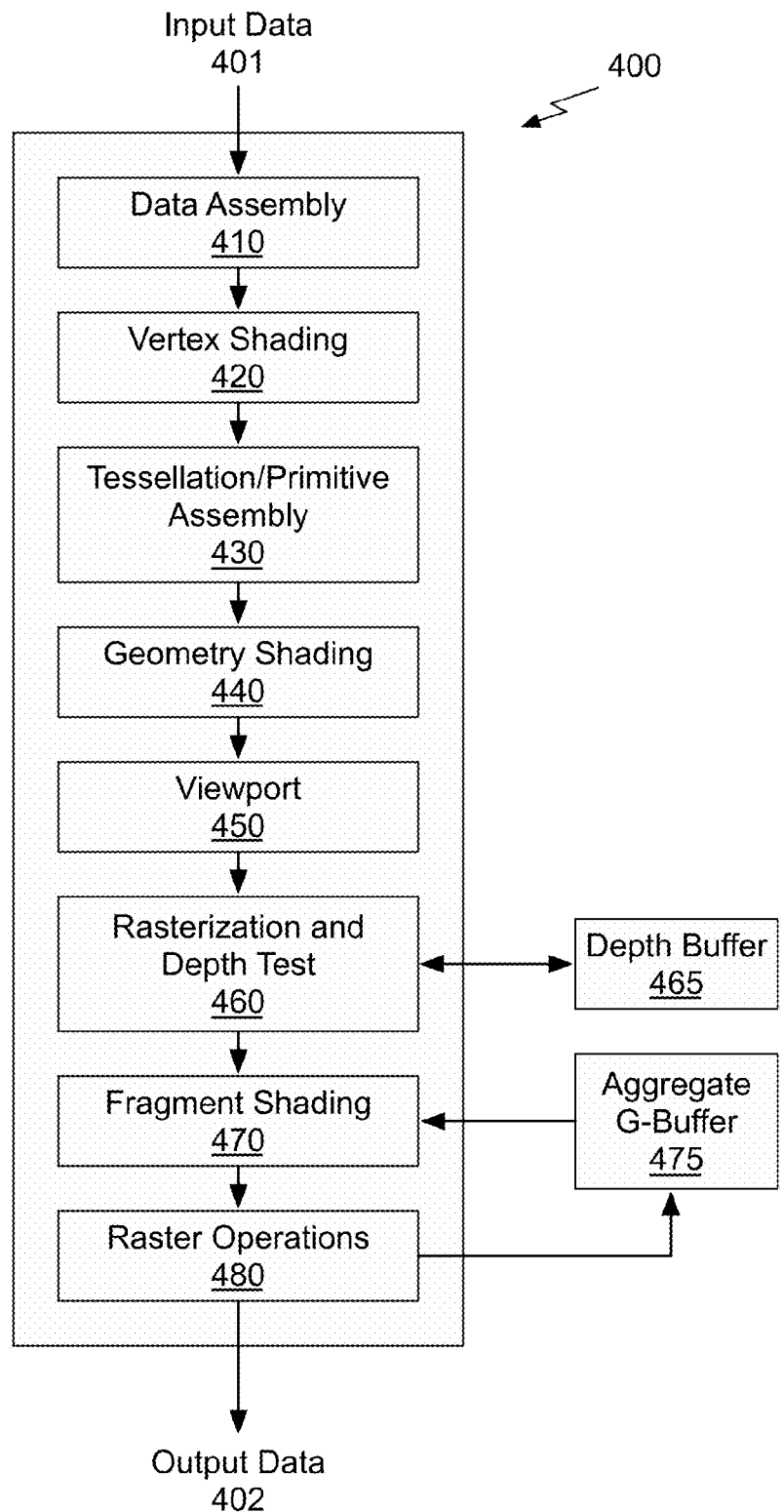
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shading stage 420, a tessellation/primitive assembly stage 430, a geometry shading stage 440, a viewport transform stage 450, a rasterization and depth test stage 460, a fragment shading stage 470, and a raster operations stage 480. In one embodiment, the input data 401 comprises commands that configure the processing units to implement the stages of the graphics processing pipeline 400 and process high-order geometric primitives (e.g., patches), as well as simpler geometric primitives (e.g., points, lines, triangles, quads, triangle strips or fans, etc.) to be processed by the stages. The output data 402 may comprise pixel data (i.e., color data) that is written into a frame buffer or other type of surface data structure in a memory. The SMs 250 may be configured by shader program instructions to function as one or more shading stages (e.g., vertex, hull, domain, geometry, and pixel shading stages) and write pixel data to the memory 204.

The data assembly stage 410 receives the input data 401 that specifies vertex data for high-order geometry. The data assembly stage 410 collects the vertex data defining the high-order graphics geometry in a temporary storage or queue, such as by receiving a command from the host processor that includes a pointer to a buffer in memory and reading the vertex data from the buffer. In one embodiment, a memory system may include one or more of the memory 204, the L2 cache 265, and the texture unit/L1 cache 390. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the tessellation/primitive assembly stage 430.

The tessellation/primitive assembly stage 430 collects vertices output by the vertex shading stage 420 and tessellates patches represented by the vertices and control points into geometric primitives. In one embodiment, the tessellation/primitive assembly stage 430 groups the vertices into geometric primitives for processing by the geometry shading stage 440. For example, the tessellation/primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Geometry shading operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport stage 450.

The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization and depth test stage 460.

The rasterization and depth test stage 460 converts the 3D geometric primitives into 2D fragments. The rasterization and depth test stage 460 may be configured to utilize the vertices of the geometric primitives to setup a set of surface equations from which various attributes can be interpolated. In one embodiment, the surface equations are plane equations in the form $Ax+By+C$, where x and y are sample locations and A, B, and C are plane equation parameters. In other embodiments, a surface equation specifies a high-order surface such as a patch. The rasterization and depth test stage 460 may also compute a coverage mask for a plurality of pixels that indicates whether one or more screen-space sample locations for the plurality of pixels intersect the geometric primitive.

When an aggregate G-buffer is used with deferred shading, the rasterization and depth test stage 460 may be configured to perform early depth-testing (i.e., z-testing) based on per-sample depth values to remove geometric primitives that will not be visible. Early depth-testing avoids processing pixels for a graphics primitive that is behind, and therefore, occluded by another graphics primitive. Early depth-testing is performed before shading operations, to avoid the expense of performing shading operations that will not contribute to the final color values of pixels in the image. The shading operations produce shaded fragments representing color data for the graphics primitives that cover at least one sample of a pixel and survived the early depth testing. The rasterization and depth test stage 460 transmits fragment data including the coverage masks and computed per-sample attributes to the fragment shading stage 470.

The deferred shading algorithm, using an aggregate G-buffer, samples coverage n times per pixel in the rasterization and depth test stage 460, where n is the geometric sampling rate. The geometric sampling rate should be high enough to ensure that fine-scale geometric details are captured in the screen-space depth buffer 465. During a first pass (pre-pass), depth values and normal vector data are computed at the geometric sampling rate and stored in the screen-space depth buffer 465 (e.g., depth target). In one embodiment, meshes are roughly sorted in the geometry shading state 440 and submitted to the viewport 450 in an approximate front-to-back order to maximize throughput and hierarchical depth testing is performed by the rasterization and depth test stage 460.

During the first pass, only attributes needed for visibility determinations and to define clusters are generated (e.g., depth and normal vector data). More specifically, no textures are fetched except for accesses of alpha maps for alpha-tested surfaces such as foliage, and no data is written to an aggregate G-buffer 475. In one embodiment, the normal vector data is the normal vector of a flat triangle primitive instead of a normal vector generated using a normal map. Therefore, the processing cost of the dense visibility pre-pass is lower than the subsequent full geometry pass (sampling all the attributes during a third pass), since the pre-pass only requires generation of surface depth and normal vector data.

Figure 5A:
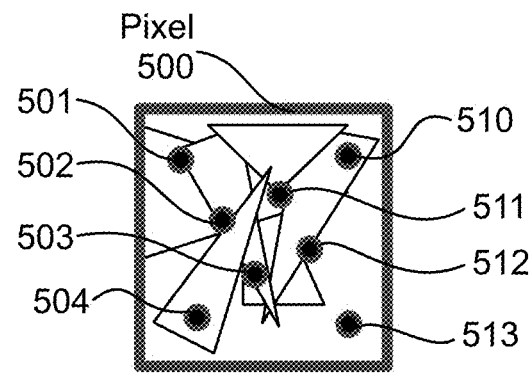
FIG. 5A illustrates the sample positions within a pixel, in accordance with one embodiment.

FIG. 5A illustrates the sample positions within a pixel 500, in accordance with one embodiment. The sample positions 501, 502, 503, 504, 510, 511, 512, and 513 are included within the pixel 500. In one embodiment, a different number (a smaller or greater number) of samples are included within the pixel 500. In another embodiment, the samples are included within a screen-space region of two or more pixels. As shown in FIG. 5A, sample positions 501, 502, 503, 504, 510, 511, and 512 are each covered by one or more fragments. Sample position 513 is not covered by a fragment. Therefore, the depth buffer 465 will store depth values and normal vector data for sample positions 501, 502, 503, 504, 510, 511, and 512. Because sample positions 510 and 512 are covered by the same fragment, the normal vector data stored in the depth buffer 465 for sample positions 510 and 512 may be equal. However, the depth values stored for samples positions 510 and 512 may be different.

Figure 5B:
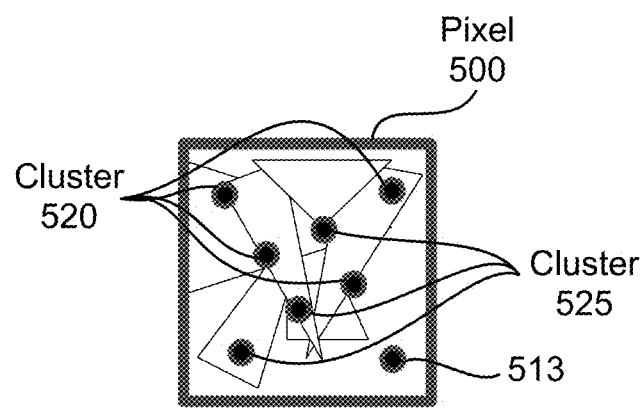
FIG. 5B illustrates the defined clusters for the pixel, in accordance with one embodiment.

FIG. 5B illustrates the defined clusters 520 and 525 for the pixel 500, in accordance with one embodiment. Cluster 520 corresponds to a first aggregate and cluster 525 corresponds to a second aggregate. Sample positions 501, 502, 510, and 512 are included within the cluster 520. Sample positions 503, 504, and 511 are included within the cluster 525. Sample position 513 is not covered by a fragment and is therefore not included in either cluster. Mapping of the samples to clusters is performed during a second pass through the graphics pipeline. Material parameters computed during a third pass for each one of the sample positions 501, 502, 510, and 512 are combined to produce the first aggregate and material parameters computed during the third pass for each of the sample positions 503, 504, and 511 are combined to produce the second aggregate. Note that the samples assigned to a cluster are not necessarily adjacent to each other. For example, the sample 511 is assigned to the cluster 525 instead of being assigned to the cluster 520 even though the adjacent samples 501, 502, 510, and 512 are all assigned to the cluster 520.

During the second processing pass the clusters of samples are defined, where each cluster corresponds to an aggregate to be computed based on the depth buffer 465 and per-sample material parameters. In one embodiment, the second pass is a full-screen compute pass that is performed using a compute program (instead of a graphics program) and processes the depth buffer 465. In another embodiments, the second pass is performed using a graphics program or is another program that executed by a CPU. When the depth values of samples are very different, depth is often the primary discriminator of likely lighting changes and depth may be used to define the clusters. When the depths of samples are similar, then orientations of the samples (or the surfaces corresponding to the samples) are more important and the normal vectors may be used to define the clusters. Corner geometry including samples having close depth and different normal vectors should be recognized and grouped into different clusters compared with depth edge geometry including samples having different depths and any normal vectors. Each visible sample in a region may be assigned to one of a plurality of clusters for the region based on one or more of depth, position, and normal vector data, as further described in conjunction with FIG. 5C.

The second pass produces a set of c cluster definitions corresponding to aggregates at each pixel from the depth buffer 465. In one embodiment, each defined cluster contains a camera-space depth value, a count of the samples included in the cluster, and normal vector data. During a third pass, each sample assigned to a cluster will be filtered to produce the aggregate corresponding to the cluster. In one embodiment, the defined clusters segregate c-modal distributions of geometry into c aggregates. For example, at a corner or depth edge, at least one cluster may be defined for each of the distinct surfaces forming the corner or edge.

Figure 5C:
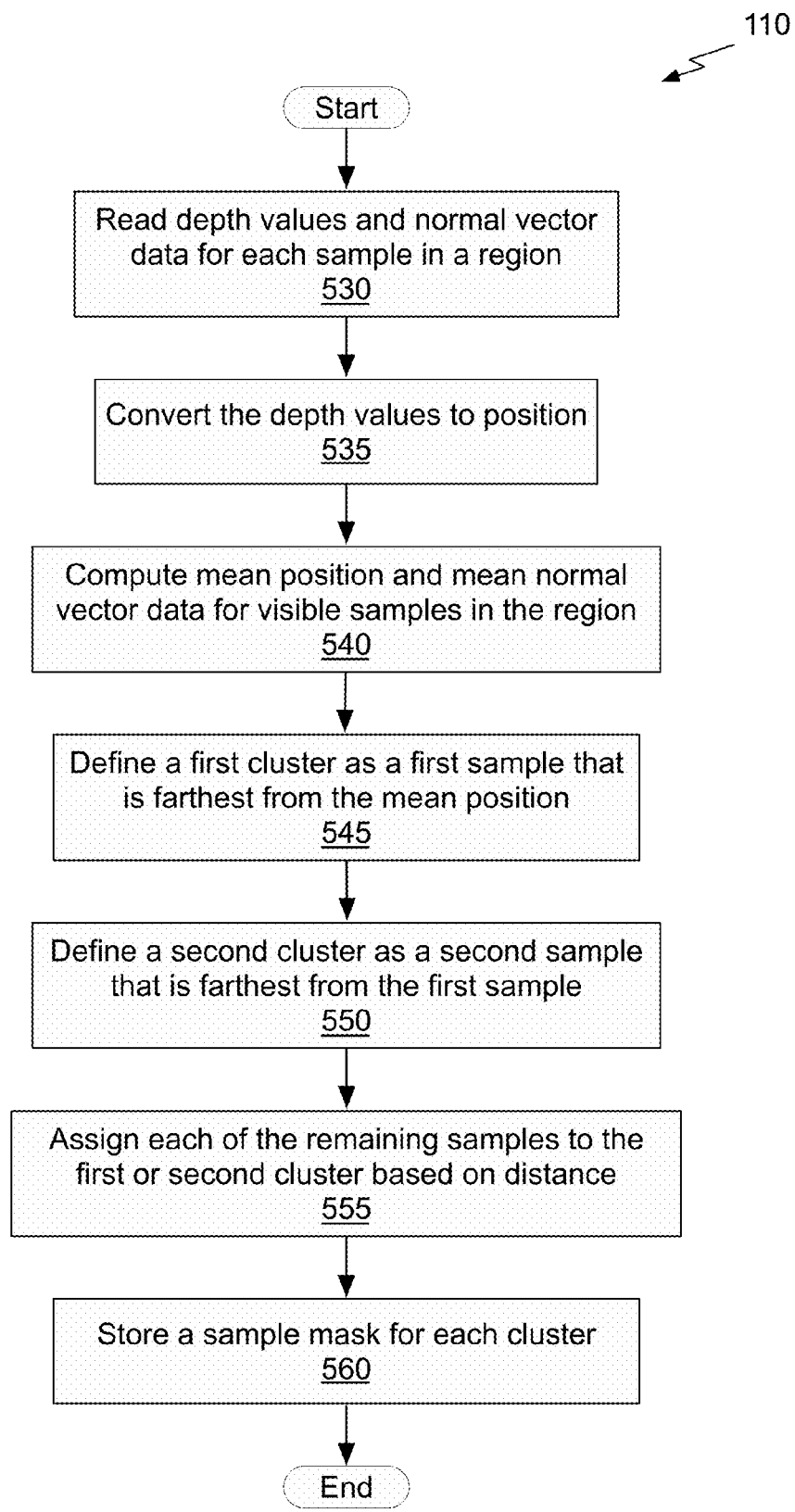
FIG. 5C illustrates a flowchart of a method for performing a step of FIG. 1, in accordance with one embodiment.

FIG. 5C illustrates a flowchart of a method for performing step 110 of FIG. 1 to define the clusters of samples, in accordance with one embodiment. At step 530, depth values and normal vector data for each sample in a region are read from the depth buffer 465. The region may be a single pixel or one or more pixels. In one embodiment, the depth buffer 465 is encoded in a compressed tile format. The depth planes in compressed tiles present both a depth value and a normal vector at each covered sample position. For pixels within such tiles, a mean normal vector (by $\Sigma \hat{n}/\|\Sigma \hat{n}\|$) and depth of all samples may be computed. When the depth buffer 465 is not encoded in a compressed tile format, the normal vector data may include data for each one of the samples assigned to the cluster and a mean depth value and mean of the normal vector data may be computed.

At step 535, the depth values (z) for each visible sample may be converted into x,y,z positions. Step 535 may be omitted and the depth values may be used directly. At step 540, a mean position (x,y,z or z) is computed for all visible samples in the region. At step 540, a mean of the normal vector data is also computed for all visible samples in the region. Note that samples that are not covered by a fragment are not included in either of the mean position computation or the mean normal vector data computation.

At step 545, a first cluster is defined to include the sample "farthest" from the mean position. A distance d between samples a and b (or each sample and the "mean sample") may be computed as:

$$d(z_a, z_b, \hat{n}_a, \hat{n}_b) = |(z_a - z_b)/k|^2 + (1 - \hat{n}_a \cdot \hat{n}_b)/2, \quad (1)$$

where constant k is the characteristic length of the scene and k cancels the distance units and specifies the largest scale at which one expects important local detail, i.e., at which orientation differences should give way to depth differences. In one embodiment, k=10 cm. In one embodiment, the depth values ($z_a$ and $z_b$) are converted to x,y,z positions at step 535 and the distance in equation (1) is computed using the x,y,z positions instead of only depth z.

At step 550, a second cluster may be defined to include the sample farthest from the first cluster. In one embodiment, the second cluster is created only when the second cluster is separated by a minimum distance t from the first cluster. Therefore, step 550 may be omitted when the second cluster is not created. After defining a first and second cluster, subsequent clusters may be defined to include a sample that maximizes the squared sum of distances from all previously defined clusters. In one embodiment, a new cluster is created when the new cluster is separated by a minimum distance t from previously defined clusters.

Once the clusters are defined, at step 555, each remaining covered sample is assigned to the nearest cluster based on d. At step 560 a sample mask is stored for each cluster. The sample mask may store an identifier for each sample, where the identifier encodes the cluster to which the sample is assigned. The number of clusters per-region may be fixed or may vary for each region. In one embodiment, the position and normal vector data of the first sample assigned to a cluster represents the position and normal vector data for the cluster.

In one embodiment, a sample count for each cluster is stored as part of the cluster definition. Because many scenes contain an emissive skybox that does not require shading, samples at a maximum depth value from a defined cluster may be excluded. Thus, the cluster sample counts may sum to less than n and measure the fractional coverage by surfaces at a finite distance from the camera. Additionally, the sample count may be used to enable re-normalization of the material parameters when mismatches between the cluster definitions and accumulated fragment values occur.

Figure 6A:
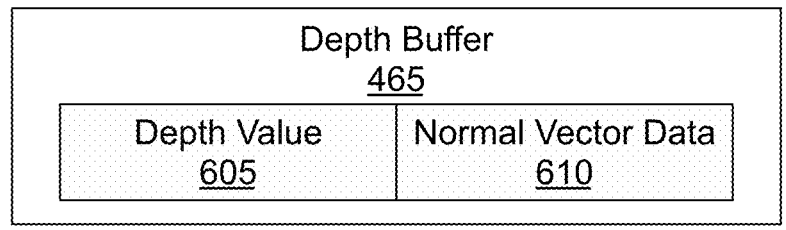
FIG. 6A illustrates the contents of the depth buffer shown in FIG. 4, in accordance with one embodiment.

FIG. 6A illustrates the contents of the depth buffer shown in FIG. 4, in accordance with one embodiment. The depth buffer 465 is configured to store a depth value 605 and normal vector data 610 for each sample. During the pre-pass computed depth values 605 and normal vector data 610 are written to the depth buffer 465. In one embodiment, the normal vector data 610 is low precision normal data. The normal vector data may be encoded using (θ, φ) spherical coordinates in pixel-space, and stored as two 8-bit components. The normal vector data computed during the pre-pass may be per-primitive normal vectors, and because primitives are back-face culled, only the visible hemisphere of normal vector directions need to be represented and stored.

Figure 6B:
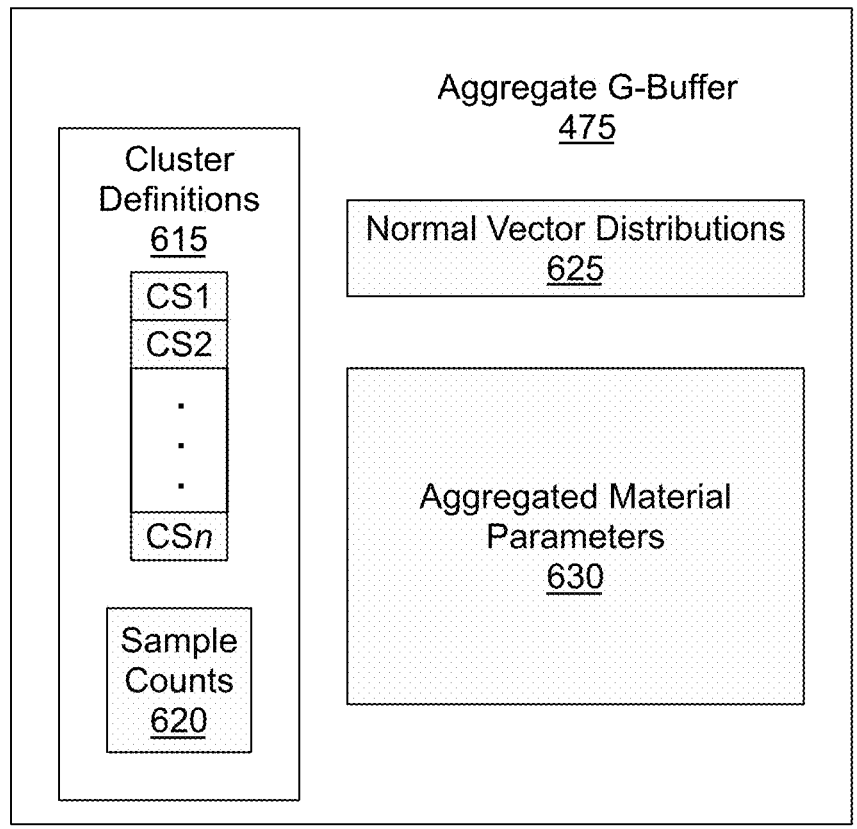
FIG. 6B illustrates the contents of the aggregate G-buffer shown in FIG. 4, in accordance with one embodiment.

FIG. 6B illustrates the contents of the aggregate G-buffer 475 shown in FIG. 4, in accordance with one embodiment. The cluster definitions 615 that are generated during the second pass include a definition for each cluster. A cluster definition includes coverage samples (CS) 1 through n, one for each sample of a pixel. Each coverage sample stores an identifier corresponding to a cluster (e.g., first, second, third, etc.) to which the sample is assigned or an identifier indicating that the sample is not covered by a fragment and therefore is not assigned to a cluster. The cluster definitions 615 may also include a sample count 620 for each of the clusters. However, in one embodiment, the sample counts 620 are not stored and the sample counts 620 are derived from the coverage samples. Cluster definitions 615 are stored for each screen-space region, where a region may include one or more pixels.

In one embodiment a normal vector distribution is computed for each cluster and stored in the normal vector distributions 625. Each normal vector distribution may be encoded as a 16-bit normalized, fixed point value. In one embodiment, Toksvig's approximation (for isotropic normal distributions) is used to represent the normal vector distribution. Other distribution schemes known in the art may also be used. In one embodiment, the aggregate G-buffer 475 includes an entry for each screen-space region, where each entry stores data associated with c clusters (e.g., c=1, 2, 3, 4, etc.). Specifically, an entry may include cluster definitions 615, normal vector distributions 625 for each cluster, and aggregated material parameters 630 for each cluster.

The aggregates that are computed for each cluster during a third pass provide a low-pass filtered version of the material parameters before shading that reduces the phenomena of aliasing after shading, as well as the computational cost of shading measured in operations, memory bandwidth and memory capacity requirements. For linear shading functions of viewer-independent terms, such as lambertian reflection, the image produced from aggregates is substantially identical to that produced by the significantly more computationally expensive step of brute force supersampling the shading.

During the third pass, material parameters are computed for each covered sample. The per-sample material parameters for each sample assigned to a cluster are combined to produce aggregated material parameters 630 for each cluster that are stored in the aggregate G-buffer 475. The aggregated material parameters 630 may include albedo, a specular coefficient, an emissive coefficient, color, metal, and the like. The sample counts 620 maybe used to combine the material parameters during the third pass. When additive blending accumulation is used to combine the material parameters during the third pass, all combined material parameters should be pre-normalized in the fragment shading stage 470 by the total number of samples per-pixel.

In one embodiment, roughness (i.e., the BRDF's glossy exponent term) is not stored directly but instead is injected as additional variance inside the normal vector distributions 625. The benefits of aggregating statistics from all elements contributing to a pixel, as opposed to a select few, is particularly apparent when rendering specular surfaces. By modeling the distribution of normal vectors specular highlight may be accurately represented. In contrast with a conventional deferred shading technique that stores n shading parameters for each pixel, only c shading parameters (i.e., material parameters) are stored for each pixel.

During the third pass, the scene geometry is rasterized and the combined material parameters are generated using additive blending and EQUAL depth testing. Even with the depth-test of the third pass set to EQUAL, a situation can happen in case of Z-fighting, when more than one fragment's depth value passes the depth test for a given sample (because the depth's of two fragments are equal). The resulting visual artifacts can be avoided in a consistent way by using the stencil test to only keep the first sample value passing the depth test.

Material parameters are computed for each sample based on the geometric sampling rate n and the aggregated material parameters are stored based on the aggregate (or cluster) rate c, where c is less than n. A pixel shader program reads the cluster definitions 615 and then iterates over the covered samples for the current fragment, of which there will be between one and n. When the coverage samples are not stored in the cluster definitions 615, the closest cluster is identified by computing d using equation 1. When the coverage samples are stored in the cluster definitions 615, the coverage samples are used to identify the cluster to which each sample is assigned.

Referring back to FIG. 4, the fragment shading stage 470 processes fragment data by performing a set of operations (i.e., a fragment shader or a program) on each of the fragments. The fragment shading stage 470 may generate shaded fragment data (i.e., shaded attributes such as color values) for the fragment such as by performing lighting operations or sampling texture maps using interpolated texture coordinates for the fragment. The shaded fragment data may be per-sample shaded attributes where one or more samples within a pixel share the same computed shaded attribute value or where a shaded attribute value is computed for each sample location within a pixel. The fragment shading stage 470 generates per-sample shaded fragment data that is transmitted to the raster operations stage 480. During the third pass, the fragment shading state 470 is configured to identify the clusters to which each computed sample is assigned and output the computed samples assigned to each cluster to the raster operations stage 480.

The raster operations stage 480 may perform various operations on the shaded fragment data such as performing alpha tests, Z-test, stencil tests, and blending the shaded fragment data with other pixel data corresponding to other fragments associated with the pixel. When the raster operations stage 480 has finished processing the shaded fragment data to produce pixel data (i.e., the output data 402), the pixel data may be written to a display surface (i.e., render target such as a frame buffer, a color buffer, Z-buffer, or the like). During the third pass, the raster operations stage 480 outputs the shaded fragment data for each cluster to the aggregate G-buffer 475. In one embodiment, the raster operations stage 480 performs additive blending to combine the material parameters for each sample with a cluster. The raster operations stage 480 then outputs the combined material parameters divided by the sample count 620 for the cluster to store as the aggregated material parameters 630 for the cluster. Dividing by the sample count 620 avoids overflow and allows incremental computation of the mean.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440).

Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

Both the pre-pass and the third pass can support stochastic rasterization. Transparency via alpha-to-coverage and depth of field in which each sample has a slightly different projection merely present coverage masks to the pixel shader because only coverage, and not depth, is affected. Because the aggregated material parameters 630 represent a statistical distribution of sub-pixel geometry, the aggregated material parameters for a particular cluster model the aggregate light scattering properties of samples that ideally receive similar illumination.

The fourth (and additional) pass is a screen-space deferred shading pass, modified to incorporate the aggregated material parameters 630 for each region. One or more of the deferred shading passes can be per-light, per-screen, tiled, or semi-deferred. Each deferred shading pass shades once per cluster, so the cost of the shading is c/n of the cost of brute-force multiple sample anti-aliasing. The shaded color for each cluster is weighted by the sample count 620 for the cluster, normalized by the total number of samples in the pixel, and then composited over the background image by the raster operations stage 480. Shading a cluster is similar to shading a bilinearly-filtered sample from a single surface and material. The aggregated material parameters 630 for each cluster contains the mean of the samples assigned to cluster. The normal vector distribution 625 for the cluster provides a non-unit mean normal. The length of the normal vector distribution 625 varies inversely with the variance of the orientation of the surfaces, and effectively models the variance during shading.

Figure 7:
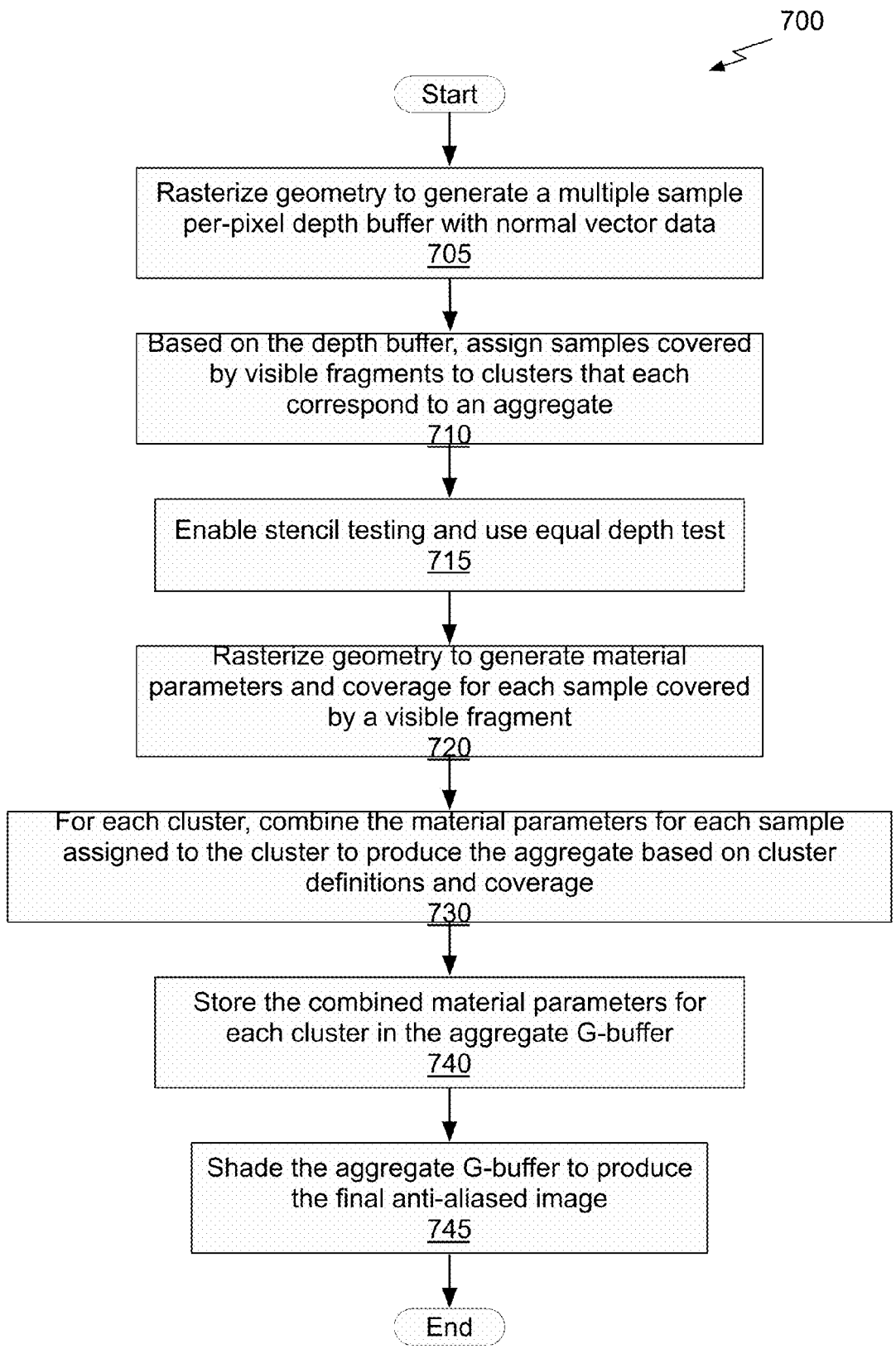
FIG. 7 illustrates a flowchart of a method 700 for performing aggregate G-buffer anti-aliasing, in accordance with one embodiment.

FIG. 7 illustrates a flowchart of a method 700 for performing aggregate G-buffer anti-aliasing, in accordance with one embodiment. At step 705, 3D geometry for a scene is rasterized during a first pass to generate a multiple sample per-pixel depth buffer that includes per-sample depth values and normal vector data. At step 710, samples are assigned to clusters during the second pass, where each cluster corresponds to an aggregate.

At step 715, stencil testing is enabled and the depth test is set to EQUALS so that only the first fragment that passes the depth test will contribute to each sample. Early depth testing and post-depth coverage should also be enabled for all passes. Additive blending should also be enabled for writing the aggregated material parameters 630 to the aggregate G-buffer 475.

At step 720, the visible geometry is rasterized during the third pass to generate material parameters (e.g., shading properties) for each of the samples. At step 730, for each cluster corresponding to an aggregate, the material parameters for each sample within the cluster are combined. Importantly, the rasterized material parameters are combined as they are generated, so that it is not necessary to store the per-sample rasterized material parameters in a buffer. The cluster definitions constructed at step 710 provide a sample-to-aggregate mapping that is used to identify the samples corresponding to each aggregate.

At step 740, the combined material parameters for each aggregate are stored as the aggregated material parameters 630 in the aggregate G-buffer 475. At step 745, the aggregate G-buffer 475 is shaded during one or more deferred shading passes to produce the final anti-aliased image.

Figure 8:
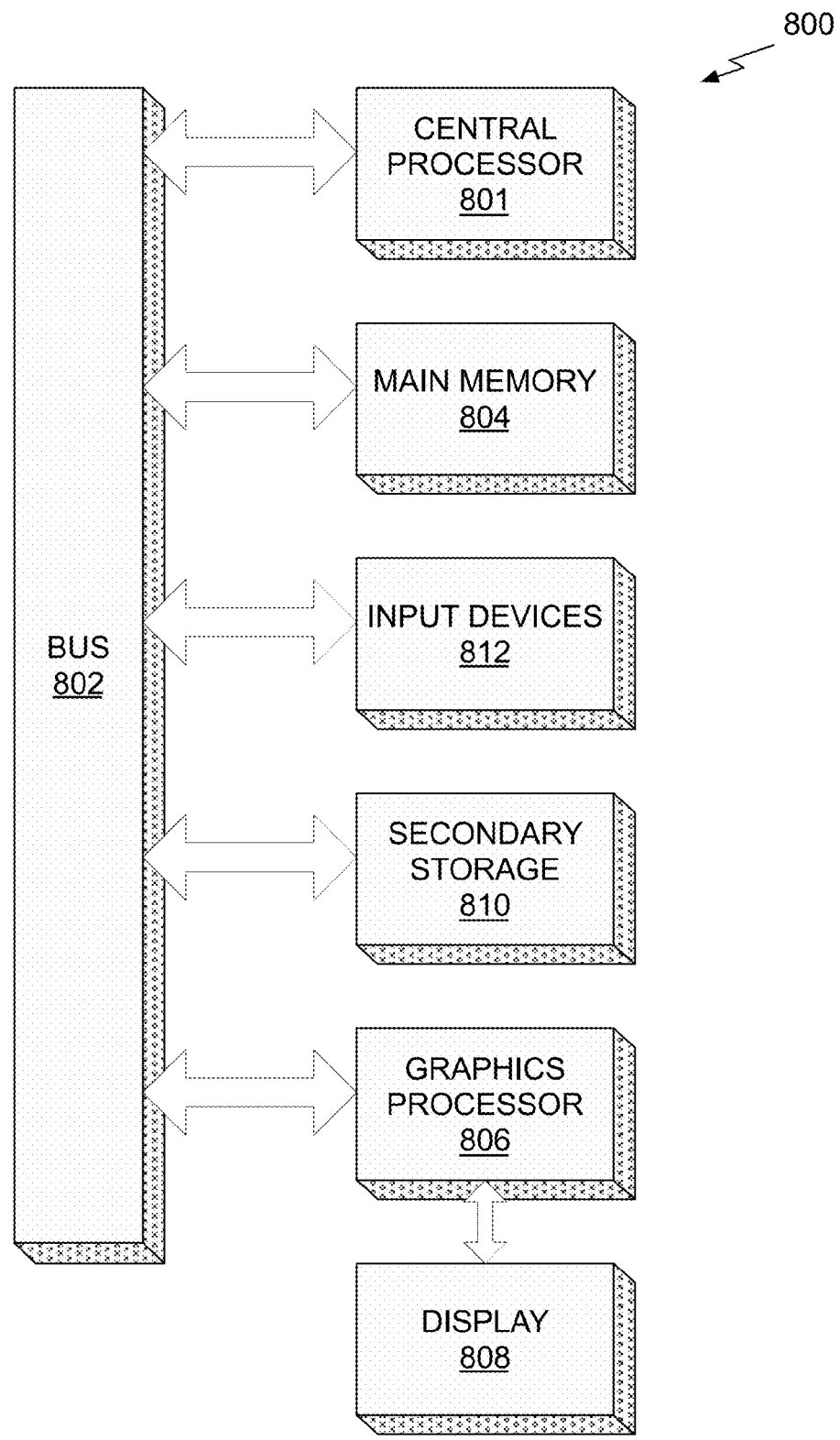
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   assigning one or more samples to a plurality of clusters, each cluster in the plurality of clusters corresponding to an aggregate stored in an aggregate geometry buffer, wherein each of the one or more samples is covered by a visible fragment;
   rasterizing three-dimensional geometry to generate material parameters for each sample of the one or more samples;
   for each cluster in the plurality of clusters, combining the material parameters for each sample assigned to the cluster to produce the aggregate; and
   storing the combined material parameters for each cluster in the aggregate geometry buffer.

2. The method of claim 1, further comprising, prior to assigning the one or more samples to the plurality of clusters, computing a mean position and a mean normal vector for the one or more samples in a screen-space region.

3. The method of claim 2, further comprising defining a first cluster of the clusters as including a first sample of the one or more samples that is farthest from the mean position.

4. The method of claim 3, further comprising defining a second cluster of the clusters as including a second sample of the one or more samples that is farthest from the first sample.

5. The method of claim 4, further comprising:
   determining that the remaining samples of the one or more samples are within a distance t of either the first cluster or the second cluster; and
   assigning each of the remaining samples to the nearest of the first cluster and the second cluster.

6. The method of claim 1, wherein the aggregate represents a statistical distribution of sub-pixel geometry within a screen-space region.

7. The method of claim 6, wherein the screen-space region is a pixel.

8. The method of claim 1, further comprising shading the combined material parameters to produce an anti-aliased image.

9. The method of claim 1, wherein the assigning of the one or more samples to the plurality clusters is based on depth values of the one or more samples.

10. The method of claim 1, wherein the assigning of samples to clusters is based on positions of the visible fragment that covers each sample.

11. The method of claim 1, wherein the assigning of the one or more samples to the plurality clusters is based on normal vector data for the visible fragment that covers each sample.

12. The method of claim 1, wherein a pixel includes n samples and c clusters are defined for the pixel, where c is less than n.

13. A non-transitory computer-readable storage medium storing instructions that, when executed by a processor, cause the processor to perform steps comprising
assigning one or more samples to a plurality of clusters, each cluster in the plurality of clusters corresponding to an aggregate stored in an aggregate geometry buffer, wherein each of the one or more samples is covered by a visible fragment;
rasterizing three-dimensional geometry to generate material parameters for each sample of the one or more samples;
for each cluster in the plurality of clusters, combining the material parameters for each sample assigned to the cluster to produce the aggregate; and
storing the combined material parameters for each cluster in the aggregate geometry buffer.

14. A system comprising:
a memory configured to store an aggregate geometry buffer; and
a plurality of multithreaded processing units that are included within a parallel processor and are coupled to the memory and configured to:
assign one or more samples to a plurality of clusters, each cluster in the plurality of clusters corresponding to an aggregate stored in the aggregate geometry buffer, wherein each of the one or more samples is covered by a visible fragment;
rasterize three-dimensional geometry to generate material parameters for each sample of the one or more samples;
for each cluster in the plurality of clusters, combine the material parameters for each sample assigned to the cluster to produce the aggregate; and
store the combined material parameters for each cluster in the aggregate geometry buffer.

15. The system of claim 14, wherein, prior to assigning the visible samples to the clusters, the plurality of processing cores are further configured to compute mean position and mean normal vector data for the one or more samples in a screen-space region.

16. The system of claim 15, wherein the plurality of processing cores are further configured to define a first cluster of the clusters as including a first sample of the one or more samples that is farthest from the mean position.

17. The system of claim 14, wherein the aggregate represents a statistical distribution of sub-pixel geometry within a screen-space region.

18. The system of claim 17, wherein the screen-space region is a pixel.

19. The system of claim 14, wherein the plurality of processing cores are further configured to shade the combined material parameters to produce an anti-aliased image.

20. The system of claim 14, wherein the one or more samples are assigned to the plurality clusters based on depth values of the one or more samples.

* * * * *